N. WRIGHT.
Sink-Traps.
No. 136,296.                                    Patented Feb. 25, 1873.
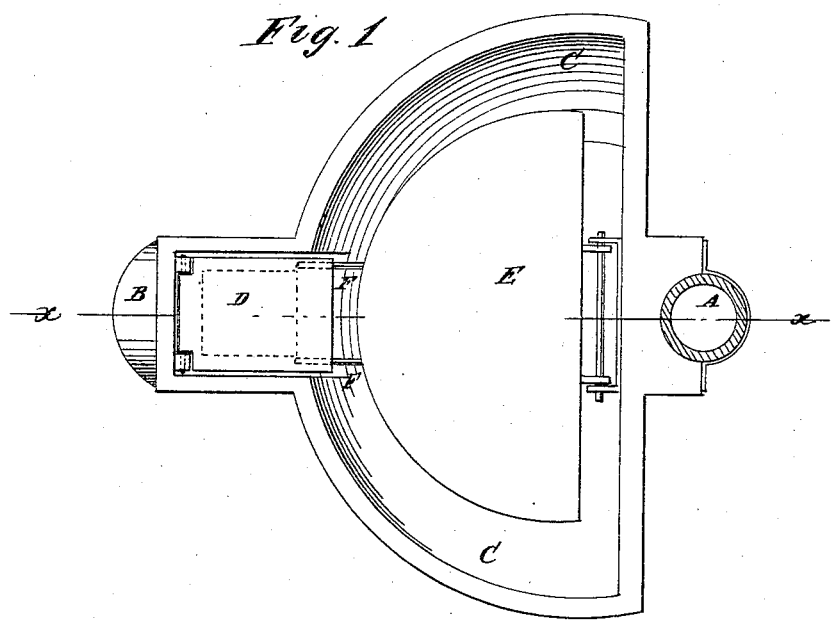
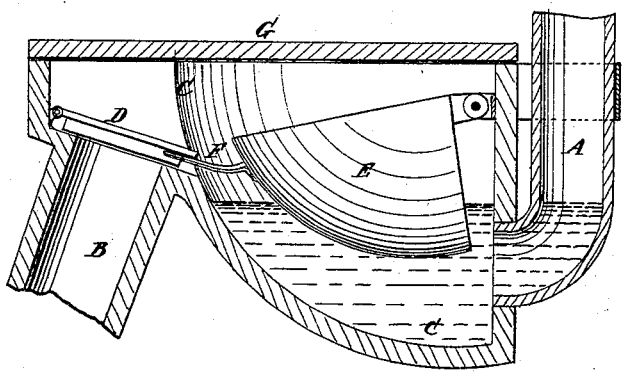
Witnesses:
Inventor:

UNITED STATES PATENT OFFICE.

NICHOLAS WRIGHT, OF NEW YORK, N. Y.

IMPROVEMENT IN SINK-TRAPS.

Specification forming part of Letters Patent No. 136,296, dated February 25, 1873.

*To all whom it may concern:*

Be it known that I, NICHOLAS WRIGHT, of the city, county, and State of New York, have invented a new and useful Improvement in Sink-Trap, of which the following is a specification:

Figure 1 is a top view of my improved sink-trap, the cover being removed. Fig. 2 is a detail vertical section of the same taken through the line $x\ x$, Fig. 1.

Similar letters of reference indicate corresponding parts.

My invention has for its object to furnish an improved sink-trap which shall be so constructed as to prevent the possibility of the waters being siphoned out, or the offensive gases from the waste-pipe escaping through the trap into the room; and which shall, at the same time, be simple in construction and easily opened and cleaned when required. The invention consists in the combination of the lever-float and the valve with the trap provided with a detachable cover, and with the inlet and outlet pipes, as hereinafter fully described.

A represents the pipe leading from the sink to the trap, and B represents the pipe leading from the trap. C represents the trap, which may be made in the form of a quarter of a sphere, or round, or square, or of any other convenient form. The inlet-pipe A is connected with the trap C near its bottom; and the outlet-pipe B is connected with it near its top, or at a somewhat higher level than the pipe B, so that the mouth of the said pipe A may be covered when the water stops running through the pipe B. The mouth of the pipe B opens into a recess in the trap C, and is closed by a valve, D, which may be hinged at its outer edge, or may move up and down upon guides. E is a float, placed in the trap C, and which is hinged or pivoted at the upper part of its forward side to the wall of the trap C. To the upper part of the rear side of the float E are attached one or more levers, F, which are connected with the valve D either by passing beneath the said valve or by passing through loops attached to its upper side.

The hinged float E thus serves as a lever for opening the valve.

If desired, the said lever may be separate, and the float connected with it; or the rear part of the float E may be rigidly connected with the valve D, and its forward part may be left free so as to lift the said valve as the float rises.

I prefer the construction first described, as requiring less space than the second construction, and moving the valve further, with any given movement of the float, than the third.

With this construction, as the water flows through the pipe A into the trap C the float E rises, raising the valve D, so that the water can flow out through the pipe B. As the water in the trap C lowers the float E descends and closes the valve D before the water has fallen sufficiently in the trap C to uncover the lower end of the pipe A, so that it may be impossible for any offensive gas to escape through the trap into the room.

G is the cover of the trap C, which should be closely fitted in place, and may be secured by lugs and bolts, by a bail and set-screw or wedges, or by clamps, or in any other convenient manner.

Having thus described my invention, I claim as new and desire to secure by Letters Patent—

The combination of the lever-float E F and valve D with the trap C, provided with a detachable cover, G, and with the inlet-pipe A and outlet-pipe B, substantially as herein shown and described.

NICHOLAS WRIGHT.

Witnesses:
    JAMES T. GRAHAM,
    ALEX. F. ROBERTS.